United States Patent [19]
Lee

[11] Patent Number: 5,694,461
[45] Date of Patent: Dec. 2, 1997

[54] METHOD FOR CONTROLLING LONG DISTANCE CALLING USING A MULTI-FREQUENCY RECEIVER

[75] Inventor: Tae-Gyu Lee, Gumi, Rep. of Korea

[73] Assignee: SamSung Electronics Co., Ltd., Suwon, Rep. of Korea

[21] Appl. No.: 643,525

[22] Filed: May 6, 1996

[30] Foreign Application Priority Data

May 10, 1995 [KR] Rep. of Korea ............... 11394/1995

[51] Int. Cl.$^6$ .................... H04M 1/66; H04M 3/38
[52] U.S. Cl. .................. 379/196; 379/156; 379/190; 379/189; 379/200; 379/283
[58] Field of Search ..................... 379/243, 189, 379/190, 200, 198, 197, 196, 156, 283

[56] References Cited

U.S. PATENT DOCUMENTS

| | | | |
|---|---|---|---|
| 3,692,951 | 9/1972 | Hestad et al. | 379/198 |
| 3,761,634 | 9/1973 | Sobanski et al. | 379/189 |
| 3,784,757 | 1/1974 | Woolf et al. | 379/189 |
| 3,906,365 | 9/1975 | Richardson et al. | 379/283 |
| 4,095,056 | 6/1978 | Ewen | 379/189 |
| 4,096,356 | 6/1978 | Burtness et al. | 379/198 |
| 4,096,357 | 6/1978 | Mogtader | 379/200 |
| 4,232,199 | 11/1980 | Boatwright et al. | 379/197 |

FOREIGN PATENT DOCUMENTS 355079554  6/1980  Japan .

Primary Examiner—Ahmad F. Matar
Attorney, Agent, or Firm—Robert E. Bushnell, Esq.

[57] ABSTRACT

A method for controlling long distance calling in an analog key telephone system having a multi-frequency receiver includes the steps of: connecting the multi-frequency receiver to a telephone connected within the system; determining whether numerical digit inputs corresponding to a complete telephone number are provided from the telephone; determining whether the telephone is provided with a class of service that restricts long distance calling, when numerical digit inputs corresponding to a complete telephone number are provided; determining whether the complete telephone number represents a long distance telephone number, when the telephone is provided with the class of service that restricts long distance calling; releasing a call initiated from the telephone, when the complete telephone number represents a long distance telephone number; connecting the call initiated from the telephone, when the telephone is not provided with the class of service that restricts long distance calling, or when the complete telephone number does not represent a long distance telephone number; determining whether a predetermined time period for which the multi-frequency receiver is to be connected to the telephone between numerical digit inputs has elapsed, when numerical digit inputs corresponding to a complete telephone number are not provided from the telephone; determining whether a numerical digit key of the telephone is in a depressed state, when the predetermined time period has elapsed; and disconnecting the multi-frequency receiver from the telephone, when a numerical digit key of the telephone is not in the depressed state.

16 Claims, 2 Drawing Sheets

METHOD FOR CONTROLLING LONG DISTANCE CALLING USING A MULTI-FREQUENCY RECEIVER

CROSS-REFERENCE TO RELATED APPLICATIONS

This application makes reference to, incorporates the same herein, and claims all benefits accruing under 35 U.S.C. §119 arising from an application for Method For Controlling Long Distance Calling Using A Multi-Frequency Receiver earlier filed in the Korean Industrial Property Office on 10 May 1995 and there duly assigned Ser. No. 11394/1995.

BACKGROUND OF THE INVENTION

The present invention relates to a dialing control method for a key telephone system, and more particularly, to a method for controlling long distance calling using a multi-frequency receiver.

Conventionally, key telephone systems have been known for offering convenience to the user since such systems typically provide specialized calling functions, as well as general calling functions. One of these specialized calling functions, referred to as a direct distance dialing (DDD) control function, is provided to restrict long distance calling based on the class of service that is provided to a given telephone connected within the key telephone system.

The concept of restricting long distance calling has been previously addressed in the prior art. For example, U.S. Pat. No. 4,095,056 entitled Toll Restrictor Access Circuit issued to Ewen discloses a circuit for use with a plurality of toll restrictors shared by a group of telephone lines. The circuit connects a toll restrictor to a telephone line when a call is initiated so that the number dialed by the caller can be monitored to determine whether the number being dialed is one that is authorized.

While toll call restriction systems are generally able to effectively prevent unauthorized long distance calls, there are ways in which the effectiveness of these systems can be defeated. For example, U.S. Pat. No. 4,096,357 entitled Toll-Call Restriction System issued to Mogtader discloses an apparatus for enabling a user to selectively defeat a toll-call restriction system. In Mogtader'357, means for applying a tone to the telephone lines through the mouthpiece of a calling telephone is provided. Detection means responsive to the tone sets a flip-flop which functions to inhibit the activation of a relay normally used to disrupt the connection between the calling telephone and telephone lines when an unpermitted telephone number is dialed.

In view of the fact that conventional long distance call restriction schemes are susceptible to defeat, I believe that a method for effectively controlling long distance calling, without the threat of defeat, can be contemplated.

SUMMARY OF THE INVENTION

Therefore, it is an object of the present invention to provide an improved method for controlling long distance calling.

It is another object to provide a method for controlling long distance calling that prevents a user from defeating a long distance calling restriction.

It is still another object to provide a method for controlling long distance calling in an analog key telephone system having a multi-frequency receiver.

It is yet another object to provide a method for controlling long distance calling that imposes a long distance calling restriction irrespective of whether a numerical digit key on the telephone is maintained in a depressed state.

These and other objects can be achieved in accordance with the principles of the present invention with a method and apparatus for controlling long distance calling in an analog key telephone system having a multi-frequency receiver. This contemplates connecting the multi-frequency receiver to a telephone connected within the system in response to an off-hook state of the telephone; determining whether numerical digit inputs corresponding to a complete telephone number are provided from the telephone through the multi-frequency receiver; determining whether the telephone is provided with a class of service that restricts long distance calling, when numerical digit inputs corresponding to a complete telephone number are provided; determining whether the complete telephone number represents a long distance telephone number, when the telephone is provided with the class of service that restricts long distance calling; releasing a call initiated from the telephone, when the complete telephone number represents a long distance telephone number; connecting the call initiated from the telephone, when the telephone is not provided with the class of service that restricts long distance calling, or when the complete telephone number does not represent a long distance telephone number; determining whether a predetermined time period for which the multi-frequency receiver is to be connected to the telephone between the numerical digit inputs has elapsed, when numerical digit inputs corresponding to a complete telephone number are not provided from the telephone through the multi-frequency receiver; determining whether a numerical digit key of the telephone is in a depressed state, when the predetermined time period has elapsed; returning to the step of determining whether numerical digit inputs corresponding to a complete telephone number are provided from the telephone through the multi-frequency receiver, when a numerical digit key of the telephone is in the depressed state; and disconnecting the multi-frequency receiver from the telephone when a numerical digit key of the telephone is not in the depressed state.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE PREFERRED EMBODIMENT

Figure 1:
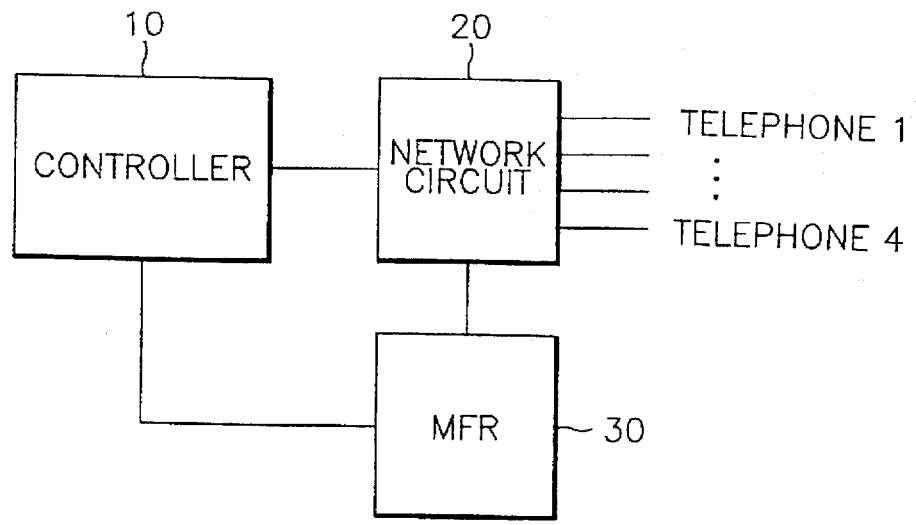
FIG. 1 is a schematic block diagram illustrating a general analog key telephone system.

Turning now to the drawings and referring to FIG. 1, a schematic block diagram of a general analog key telephone system is shown. In FIG. 1, an analog key telephone system for providing specialized calling functions utilizes a multi-frequency receiver (MFR) 30 to detect a dialing signal representative of a dialed numerical digit provided from telephones through a network circuit 20. That is, if a user picks up the handset of a telephone (i.e., creating an off-hook state), a controller 10 senses loop formation, and connects multi-frequency receiver (MFR.) 30 to an extension of the corresponding telephone through network circuit 20 in order to sense the numerical digit that is provided from the corresponding telephone. Multi-frequency receiver (MFR) 30 detects a dual tone multi-frequency (DTMF) signal from the telephone, converts the dual tone multi-frequency (DTMF) signal into digital data and transmits the digital data to controller 10, which serves as the main control means of the key telephone system. Controller 10 processes a call by sensing what numerical digits are depressed. Multi-frequency receiver (MFR) 30 is disclosed in detail in Korean Patent Application No. 90-5168. In executing an office line call, the dual tone multi-frequency (DTMF) signal is generated by the telephone and sent directly to the office line.

To restrict long distance calling, controller 10 senses what numerical digits are entered from a corresponding telephone. To this end, controller 10 connects multi-frequency receiver (MFR) 30 to the extension of the telephone through network circuit 20 in response to an off-hook signal from the telephone. If a dialing signal is received, and another dialing signal is not received within a predetermined period of time, controller 10 disconnects multi-frequency receiver (MFR) 30 from the corresponding telephone so that it may be connected to another telephone. Typically, one multi-frequency receiver (MFR) is included in the analog key telephone system for every four telephones.

In a conventional method for controlling long distance calling in an analog key telephone system, when a telephone subscriber lifts the handset of a telephone connected to the system, controller 10 senses the off-hook state of the telephone by checking an electrical loop. When the off-hook state is sensed, controller 10 first ensures that multi-frequency receiver (MFR) 30 is in a free state, and then connects (i.e., allocates) multi-frequency receiver (MFR) 30 to the corresponding telephone through network circuit 20. The time period for which multi-frequency receiver (MFR) 30 is allocated to a given telephone varies slightly among key telephone systems. Typically, this time period extends for about 20 seconds after the telephone selects the office line. The time period for which multi-frequency receiver (MFR) 30 is allocated to a given telephone is set based on the maximum time that a dial tone is provided from a central office exchange.

Figure 2:
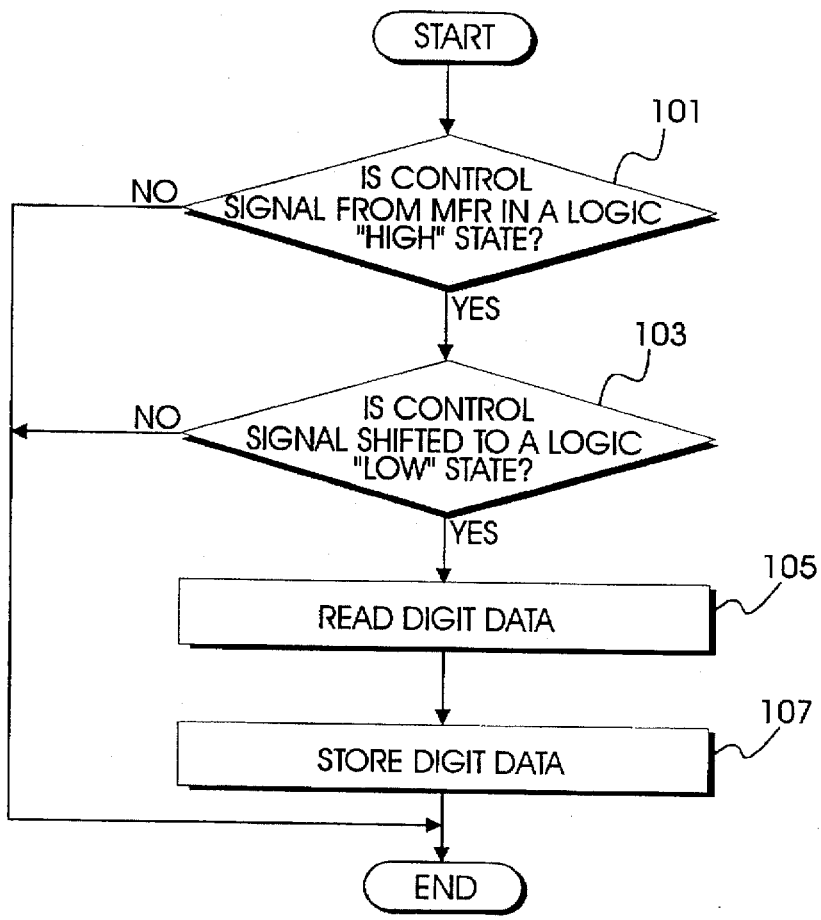
FIG. 2 is a flow chart illustrating a method for processing numerical digit data provided from a multi-frequency receiver (MFR) in a general analog key telephone system.

FIG. 2 is a flow chart illustrating a method for processing numerical digit data provided from multi-frequency receiver (MFR) 30 in a general analog key telephone system. When a dialing signal representative of a numerical digit is detected through network circuit 20, multi-frequency receiver (MFR) 30 generates a control signal in a logic "high" state to indicate that the dialing signal is received. When controller 10 receives the control signal in a logic "high" state from multi-frequency receiver (MFR) 30 in step 101, controller 10 then determines whether or not the control signal shifts from the logic "high" state to a logic "low" state, in step 103. That is, when the dialing signal representative of a single numerical digit has been received through network circuit 20, multi-frequency receiver (MFR) 30 shifts the control signal from a logic "high" state to a logic "low" state. After the control signal shifts from the logic "high" state to the logic "low" state, controller 10 reads digit data provided from an output port of multi-frequency receiver (MFR) 30, in step 105. Controller 10 then stores the digit data, in step 107.

After one numerical digit is detected from the telephone, the time period for which multi-frequency receiver (MFR) 30 is allocated to the corresponding telephone is reduced to about 15 seconds. This reduced time is cleared each time a new numerical digit is received. If 15 seconds pass without receiving a numerical digit, controller 10 disconnects multi-frequency receiver (MFR) 30 from the corresponding telephone so that it may be connected to another telephone. Thereafter, controller 10 checks the number dialed from a given telephone, and controls long distance calling based on whether the given telephone is provided with a class of service that restricts long distance calling.

With the method described above, however, if the telephone user implements direct distance dialing (DDD) for a long distance call in a state in which a numerical digit key on the telephone is depressed until multi-frequency receiver (MFR) 30 is disconnected, it becomes difficult to control and restrict long distance calling.

In the following description, well-known functions and components are not described in detail so as not to obscure the present invention.

Figure 3:
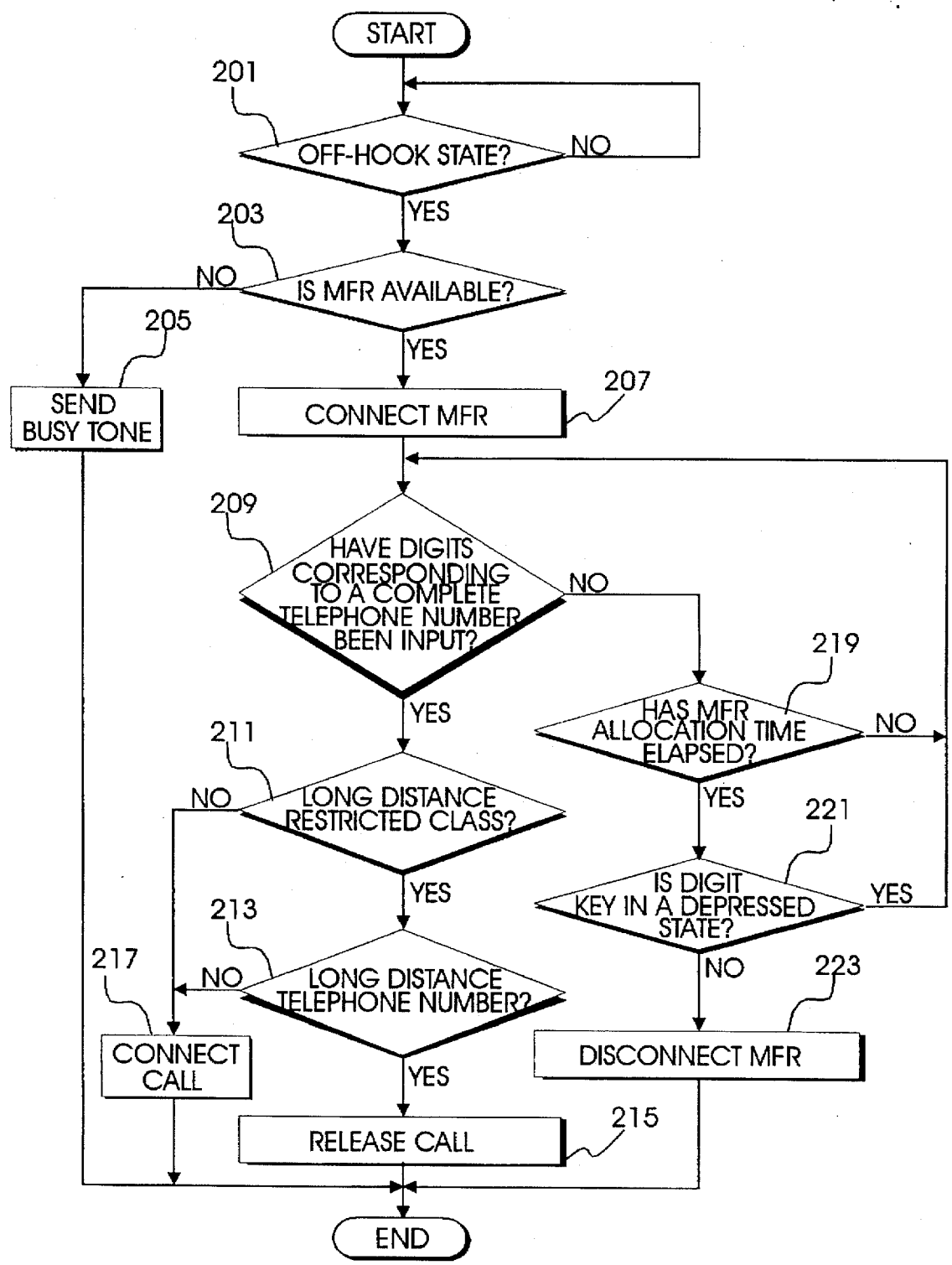
FIG. 3 is a flow chart illustrating a method for controlling long distance calling using a multi-frequency receiver (MFR) according to the principles of the present invention.

Referring to FIG. 3, a flow chart of a method for controlling long distance calling using multi-frequency receiver (MFR) 30 according to the principles of the present invention is shown. In step 201, controller 10 checks for an off-hook state of a telephone. If the off-hook state is detected, controller 10 determines whether or not multi-frequency receiver (MFR) 30 is available for use (i.e., in a free state), in step 203. If multi-frequency receiver (MFR) 30 is not available, controller 10 transmits a busy tone to the telephone, in step 205. If multi-frequency receiver (MFR) 30 is available, controller 10 connects multi-frequency receiver (MFR) 30 to the telephone through network circuit 20, in step 207.

In step 209, controller 10 determines whether or not numerical digits corresponding to a complete telephone number have been input from the telephone through multi-frequency receiver (MFR) 30. When numerical digit inputs corresponding to a complete telephone number are detected, controller 10 determines whether or not the applicable telephone is provided with a class of service that restricts long distance calling, in step 211. If the telephone is not provided with a class of service that restricts long distance calling, the call placed from the telephone is connected, in step 217. However, if the applicable telephone is provided with a class of service that restricts long distance calling, controller 10 determines whether the input telephone number is a long distance telephone number, in step 213. If the input telephone number is not a long distance telephone number, the call is connected in step 217. If the input telephone number is a long distance telephone number, the call is released in step 215.

Referring back to step 209, when numerical digit inputs corresponding to a complete telephone number are not detected, controller 10 determines whether or not the predetermined time period for which multi-frequency receiver (MFR) 30 is to be allocated to the telephone between the numerical digit inputs has elapsed during the input of the numerical digits, in step 219. If the allocation time has elapsed, controller 10 determines whether or not a numerical digit key on the telephone is in a depressed state, in step 221. Step 209 is repeated when the allocation time has not elapsed, in step 219, and also when a numerical digit key on the telephone is in a depressed state, in step 221. When a numerical digit key on the telephone is not in a depressed state, in step 221, controller 10 disconnects multi-frequency receiver (MFR) 30 from the telephone, in step 223.

As may be apparent from the foregoing description, the allocation time of multi-frequency receiver (MFR) 30 is checked, and when the allocation time has elapsed, a numerical digit depression state is checked. If the numerical digit depressed state exists, disconnection of multi-frequency receiver (MFR) 30 is postponed to prevent monitoring from being escaped. Therefore, an active long distance call restriction function can be effectively implemented.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for controlling long distance calling in an analog key telephone system having a multi-frequency receiver, said method comprising the steps of:

connecting said multi-frequency receiver to a telephone connected within said system in response to an off-hook state of said telephone;

determining whether numerical digit inputs corresponding to a complete telephone number are provided from said telephone through said multi-frequency receiver;

determining whether said telephone is provided with a class of service that restricts long distance calling, when said numerical digit inputs corresponding to said complete telephone number are provided;

determining whether said complete telephone number represents a long distance telephone number, when said telephone is provided with said class of service that restricts long distance calling;

releasing a call initiated from said telephone, when said telephone is provided with said class of service that restricts long distance calling and said complete telephone number represents said long distance telephone number;

connecting said call initiated from said telephone, when said telephone is not provided with said class of service that restricts long distance calling, or when said complete telephone number does not represent said long distance telephone number;

determining whether a predetermined time period for which said multi-frequency receiver is to be connected to said telephone between said numerical digit inputs has elapsed, when said numerical digit inputs corresponding to said complete telephone number are not provided from said telephone through said multi-frequency receiver;

determining whether a numerical digit key of said telephone is in a depressed state, when said predetermined time period has elapsed;

repeating said step of determining whether said numerical digit inputs corresponding to said complete telephone number are provided from said telephone through said multi-frequency receiver, when said numerical digit key of said telephone is in said depressed state; and disconnecting said multi-frequency receiver from said telephone when said numerical digit key of said telephone is not in said depressed state.

2. The method as claimed in claim 1, further comprised of repeating said step of determining whether said numerical digit inputs corresponding to said complete telephone number are provided from said telephone through said multi-frequency receiver, when said predetermined time period has not elapsed.

3. A method for controlling long distance calling in an analog key telephone system having a multi-frequency receiver, said method comprising the steps of:

determining whether a telephone connected within said system is in an off-hook state;

determining whether said multi-frequency receiver is available for use, when said telephone is in said off-hook state;

connecting said multi-frequency receiver to said telephone, when said multi-frequency receiver is available for use;

determining whether numerical digit inputs corresponding to a complete telephone number are provided from said telephone through said multi-frequency receiver;

determining whether said telephone is provided with a class of service that restricts long distance calling, when said numerical digit inputs corresponding to said complete telephone number are provided;

determining whether said complete telephone number represents a long distance telephone number, when said telephone is provided with said class of service that restricts long distance calling;

connecting a call initiated from said telephone, when said telephone is not provided with said class of service that restricts long distance calling, or when said complete telephone number does not represent said long distance telephone number;

determining whether a predetermined time period for which said multi-frequency receiver is to be connected to said telephone between said numerical digit inputs has elapsed, when said numerical digit inputs corresponding to said complete telephone number are not provided from said telephone through said multi-frequency receiver;

determining whether a numerical digit key of said telephone is in a depressed state, when said predetermined time period has elapsed;

repeating said step of determining whether said numerical digit inputs corresponding to said complete telephone number are provided from said telephone through said multi-frequency receiver, when said numerical digit key of said telephone is in said depressed state; and disconnecting said multi-frequency receiver from said telephone when said numerical digit key of said telephone is not in said depressed state.

4. The method as claimed in claim 3, further comprised of repeating said step of determining whether said numerical digit inputs corresponding to said complete telephone number are provided from said telephone through said multi-frequency receiver, when said predetermined time period has not elapsed.

5. The method as claimed in claim 3, further comprising a step of releasing said call initiated from said telephone, when said telephone is not provided with said class of service that restricts long distance calling and said complete telephone number represents said long distance telephone number.

6. The method as claimed in claim 4, further comprising a step of releasing said call initiated from said telephone, when said telephone is not provided with said class of service that restricts long distance calling and said complete telephone number represents said long distance telephone number.

7. The method as claimed in claim 3, further comprising a step of transmitting a busy tone to said telephone, when said multi-frequency receiver is not available for use.

8. The method as claimed in claim 6, further comprising a step of transmitting a busy tone to said telephone, when said multi-frequency receiver is not available for use.

9. An apparatus for controlling long distance calling in an analog key telephone system, said apparatus comprising:

a network circuit connected to a plurality of telephones within said system;

a multi-frequency receiver connectable to each one of said telephones through said network circuit for receiving numerical digit inputs; and a controller for controlling operation of said apparatus by connecting said multi-frequency receiver to a first one of said telephones in response to an off-hook state of said first telephone, determining whether said numerical digit inputs provided from said first telephone through said multi-frequency receiver correspond to a complete telephone number, determining whether a predetermined time period for which said multi-frequency receiver is to be connected to said first telephone between said numerical digit inputs has elapsed when said numerical digit inputs provided from said first telephone through said multi-frequency receiver do not correspond to said complete telephone number, determining whether a numerical digit key of said first telephone is in a depressed state when said predetermined time period has elapsed, continuing to determine whether said numerical digit inputs provided from said first telephone through said multi-frequency receiver correspond to said complete telephone number when said numerical digit key of said first telephone is in said depressed state, and disconnecting said multi-frequency receiver from said first telephone when said numerical digit key of said first telephone is not in said depressed state.

10. The apparatus as claimed in claim 9, further comprised of said controller determining whether said first telephone is provided with a class of service that restricts long distance calling when said numerical digit inputs provided from said first telephone through said multi-frequency receiver correspond to said complete telephone number, determining whether said complete telephone number represents a long distance telephone number when said first telephone is provided with said class of service that restricts long distance calling, releasing a call initiated from said first telephone when said first telephone is provided with said class of service that restricts long distance calling and said complete telephone number represents said long distance telephone number, and connecting said call initiated from said first telephone when said first telephone is not provided with said class of service that restricts long distance calling or when said complete telephone number does not represent said long distance telephone number.

11. The apparatus as claimed in claim 9, further comprised of said controller determining whether said multi-frequency receiver is available for use prior to connecting said multi-frequency receiver to said first telephone.

12. The apparatus as claimed in claim 11, further comprised of said controller transmitting a busy tone to said first telephone when said multi-frequency receiver is not available for use.

13. The apparatus as claimed in claim 10, further comprised of said controller determining whether said multi-frequency receiver is available for use prior to connecting said multi-frequency receiver to said first telephone.

14. The apparatus as claimed in claim 13, further comprised of said controller transmitting a busy tone to said first telephone when said multi-frequency receiver is not available for use.

15. A method for controlling long distance calling in an analog key telephone system having a multi-frequency receiver, said method comprising the steps of:

connecting said multi-frequency receiver to a first telephone connected within said system in response to an off-hook state of said first telephone;

determining whether numerical digit inputs provided from said first telephone through said multi-frequency receiver correspond to a complete telephone number;

determining whether a predetermined time period for which said multi-frequency receiver is to be connected to said first telephone between said numerical digit inputs has elapsed when said numerical digit inputs provided from said first telephone through said multi-frequency receiver do not correspond to said complete telephone number;

determining whether a numerical digit key of said first telephone is in a depressed state when said predetermined time period has elapsed;

continuing to determine whether said numerical digit inputs provided from said first telephone through said multi-frequency receiver correspond to said complete telephone number when said numerical digit key of said first telephone is in said depressed state; and disconnecting said multi-frequency receiver from said first telephone when said numerical digit key of said first telephone is not in said depressed state.

16. The method as claimed in claim 15, further comprising steps of:

determining whether said first telephone is provided with a class of service that restricts long distance calling when said numerical digit inputs provided from said first telephone through said multi-frequency receiver correspond to said complete telephone number;

determining whether said complete telephone number represents a long distance telephone number when said first telephone is provided with said class of service that restricts long distance calling;

releasing a call initiated from said first telephone when said first telephone is provided with said class of service that restricts long distance calling and said complete telephone number represents said long distance telephone number; and connecting said call initiated from said first telephone when said first telephone is not provided with said class of service that restricts long distance calling or when said complete telephone number does not represent said long distance telephone number.

* * * * *